April 1, 1952     H. D. HUTCHINSON     2,591,157
METHOD AND APPARATUS FOR PRODUCING VAPOR TRAILS
Filed June 9, 1950
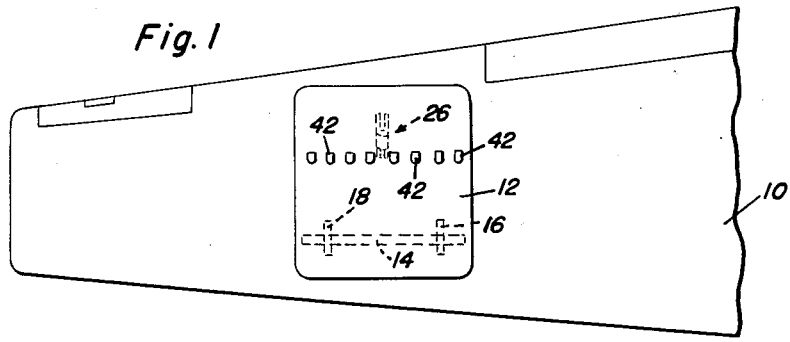
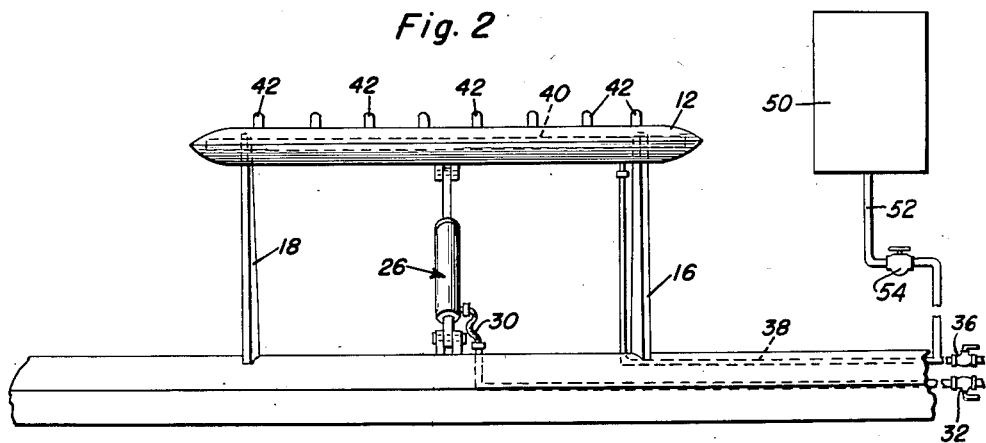
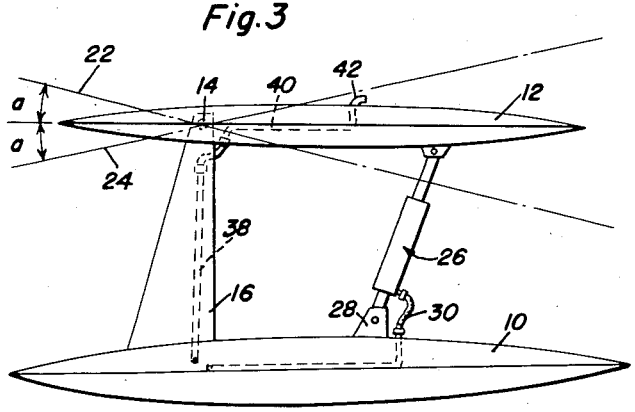
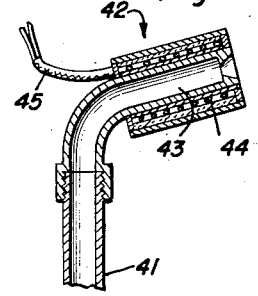
Harold D. Hutchinson
INVENTOR.
BY *Clarence A. O'Brien*
*and Harvey B. Jacobson*
Attorneys Patented Apr. 1, 1952

2,591,157

UNITED STATES PATENT OFFICE 2,591,157

METHOD AND APPARATUS FOR PRODUCING VAPOR TRAILS

Harold D. Hutchinson, Gardena, Calif.

Application June 9, 1950, Serial No. 167,077

5 Claims. (Cl. 40—127.1)

This invention relates to a new method and apparatus for artificially producing vapor trails in the air for the purpose of sky writing.

The main object of this invention is to provide vapor trails or condensation trails at rather high altitudes, that is, in the region of 20,000 feet above sea level by condensation produced from the vapor in the air or as supplemented by liquid, said vapor being caused to freeze into ice crystals which will remain suspended in the air for rather long periods. A feature of such sky writing is that the air is generally smooth at that altitude, that is, there is very little turbulence so that the particles of ice will remain in the distribution as they obtain when they were formed.

Another object of this invention is to start and stop formation of the vapor trails at any desired time by shifting the angle of attack of an auxiliary airfoil mounted on the normal airfoil of an aircraft or mounted on any other convenient part of the aircraft.

Ancillary objects and features of importance will become apparent in following the description of the illustrated form of the invention and the analysis of the method involved in producing the vapor trails.

In the drawings:

Figure 1 is a fragmentary plan view of a part of an aircraft with the auxiliary airfoil mounted thereon;

Figure 2 is a fragmentary elevational view of the structure in Figure 1 in an enlarged scale;

Figure 3 is an end view of the device in Figure 1; and

Figure 4 is an enlarged fragmentary detail view showing one of the nozzles employed in the invention and a heater therearound to prevent freezing of liquid in the nozzle.

The broadest aspect of the invention is to create vapor trails in the air by artificial means or by a stimulus carried by an aircraft, the vapor trails being used for the purpose of sky writing.

At the outset in this matter it is recognized that the conditions necessary for the formation of vapor trails are rather restricted, this being seen by the fact that very few aeroplanes traveling at high altitudes produce vapor trails.

In the following publications of the National Advisory Committee for Aeronautics, the problem of vapor trails is discussed, to-wit, Pearson, H. A., "Progress in the Investigation of Condensation Trails Left by Airplanes in Flight" CB, March 1942; Rhode, Richard V., and Pearson, H. A., "Condensation Trails—Where They Occur and What Can Be Done About Them" CB, September 1942; and Rhode, Richard V., and Pearson, H. A., "Notes on Prediction and Elimination of Exhaust Type Condensation Trails" CB, September 1942. In these articles it is stated that condensation trails are created by moisture in exhaust fumes, adiabatic expansion of the air as it passes over the wing of the aircraft, especially at the wing tips thereof because of the wing tip vorticies, and disturbing super-cooled moist air. The first and last of the above phenomena cannot be controlled, that is, they cannot be arbitrarily turned "on" and "off" but the second can be controlled by means of an airfoil which determines whether or not there is to be a pressure drop, and a resulting adiabatic expansion surrounding the airfoil or at least, adjacent the airfoil.

In order that the instant method may be carried out rather special conditions must exist in the atmosphere. The atmosphere must be near saturation such that the temperature drop caused by the airfoil will lower the temperature of the air below the dew point, and cause condensation. The atmosphere must not be too saturated otherwise condensation will take place continuously. Thus, there is an optimum condition existing in the atmosphere for which the instant method and apparatus will operate best.

Referring now to the drawings, the wing 10 is illustrated with the usual control surfaces. This wing is illustrative of any suitable component of an aircraft, it being impractical to show every location on an aircraft where the device may be attached.

An airfoil 12 is mounted by means of the pivot pin 14 and the standards 16 and 18 on the wing 10. The airfoil 12 supports the pivot pin 14 closer to the leading edge than the trailing edge as disclosed in Figure 3. The selection of the airfoil is left within the capabilities of a skilled designer. A symmetrical airfoil is disclosed in Figure 3 and by the lines 22 and 24 it is seen that the airfoil is capable of being pivoted about the pin 14 to vary the angle of attack $a$ from approximately plus 15 degrees to minus 15 degrees.

A cylinder-piston assembly 26 is pivoted to the airfoil 12 and to a bracket 28 carried by the wing 10. A hose 30 extends from the piston-cylinder assembly 26 through the wing and to a control valve 32 schematically illustrative of any suitable valve control.

A water line, adapted to conduct water passes through the wing 10 and is provided with a water control valve 36. This valve may be of any suitable and conventional type and connects by means of a conduit with a supply of liquid. The water line 38 extends from the valve and passes into the airfoil 12 and specifically a manifold 40 therein. At spaced intervals along the top of the airfoil there is a number of nozzles 42. Each nozzle is identical in construction.

As disclosed in Figures 3 and 4 the nozzles are directed rearwardly so as to cause a spray of water from the line 38 to be discharged behind and slightly above the airfoil 12.

As disclosed in Figure 4, the manifold being provided with upwardly extending individual branches 41 are end threaded so as to connect the nozzle body 43 thereto and a heater 44 which is electrically operative through the wires 45 is disposed on the outside surface of the heater body in order to retain it at such temperature that the nozzle will not be caused to become inoperative due to freezing.

In operation the aircraft with the wing 10 thereon is flown at a rather high altitude. The airfoil 12 is moved to the angle of attack which will cause a rather great low pressure region therebehind. The water jets 42 are employed for the purpose of providing a near saturation condition to the air adjacent the airfoil. If this condition exists in the atmosphere, the water jets are not employed. However, it may be necessary to artificially induce saturation, or near saturation of the atmosphere when the normal atmospheric conditions are not optimum. Accordingly, with the employment of the water spray and the inducement of a low pressure region behind the airfoil, sublimation will occur, that is, the condensed moisture will immediately freeze into ice and the ice instead of melting after a period of time is converted from the solid state to the vapor state without actually going through the liquid state. This phenomenon takes place at a slow rate and accordingly, the vapor trails will persist for some time.

The actual physical process involved in this:

When the airfoil 12 is shifted to a desired angle of attack, either negative or positive, a low pressure region is created behind the airfoil. This causes the air adjacent to said region to expand adiabatically into the low pressure region, thereby lowering the heat content of the air in said region. By this action the liquid content of said region is frozen.

Due to the high degree of purity of the air at altitudes of approximately 20,000 feet, it may be necessary to emit powdered solids, as finely ground sand, ordinary face powder of the cosmetic type, or other types of solids which are in the powdered state as may be chosen. The purpose of such an expedient is to provide a means upon which the liquid may accumulate. The solid materials may be emitted through one or more jets similar to those indicated at 42 and located on the airfoil 12. As an alternative they may be discharged through the manifold 40 employed to distribute the water by communicating a container 50, as by conduit 52, with the water line 38. A control valve 54 controlling the flow through the conduit 52, is provided in that conduit.

Having described the invention, what is claimed as new is:

1. The process of artificially producing vapor trails for sky writing comprising the steps of passing an airfoil through the air creating a low pressure region behind the airfoil causing the adjacent air to expand adiabatically into the low pressure region, thereby lowering the heat content of the air in said region and thereby causing the liquid content of said region to be reduced in heat content below the freezing point, and spraying water behind the airfoil and in the region to freeze.

2. The process of artificially producing vapor trails for sky writing comprising the steps of passing an airfoil through the air creating a low pressure region behind the airfoil causing the adjacent air to expand adiabatically into the low pressure region, thereby lowering the heat content of the air in said region and thereby causing the liquid content of said region to be reduced in heat content below the freezing point, and spraying liquid and powdered solids in said region to provide sufficient liquid for freezing in quantity in the region and a means upon which the liquid accumulates.

3. A device for use on an aircraft to produce vapor trails for sky writing, said device comprising an airfoil adapted to be passed through the air to thereby create a low pressure region behind the airfoil causing the adjacent air to expand adiabatically into the low pressure region, thereby lowering the heat content of the air in said region and thereby causing the liquid content of the region to freeze, and means arranged in said airfoil for spraying liquid behind the airfoil and in the region to freeze, said airfoil being mounted on a part of the aircraft for pivotal movement, and means secured to said airfoil for tilting said airfoil to change the angle of attack thereof.

4. The combination with an aircraft component which is arranged to constitute a support, of an attachment for producing vapor trails, said attachment being carried by the support and being of airfoil shape and adapted to be drawn through the air with the aircraft component in order to produce a low pressure region behind the airfoil shaped attachment for causing adjacent air to expand adiabatically into the low pressure region, thereby lowering the heat content of the air and moisture in the air in said region, means arranged to supply additional moisture in said region for freezing in quantity, and means operatively connected with the last mentioned means for controlling the quantity of additional moisture supplied in said region.

5. The combination of claim 4 and means connected to said attachment for selectively varying the angle of attack thereof.

HAROLD D. HUTCHINSON.

REFERENCES CITED

The following references are of record in the file of this patent:

UNITED STATES PATENTS

| Number | Name | Date |
| --- | --- | --- |
| Re. 15,771 | Savage | Feb. 19, 1924 |
| 1,501,818 | Soulek | July 15, 1924 |